United States Patent Office 3,287,339
Patented Nov. 22, 1966

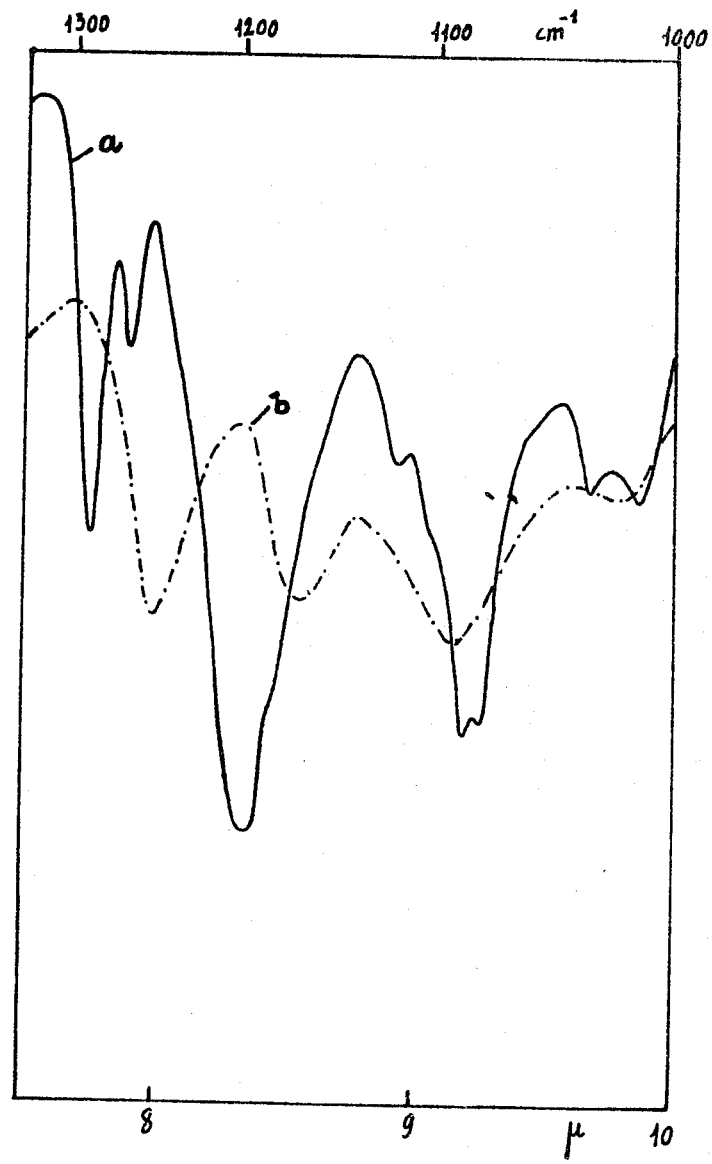

3,287,339
PROCESS FOR THE POLYMERIZATION OF FLUORINATED OLEFINS AND POLYMERIC PRODUCTS OBTAINED THEREFROM
Dario Sianesi and Gerardo Caporiccio, Milan, Italy, assignors to Montecatini Società Generale per l'Industria Mineraria e Chimica, Milan, Italy, a corporation of Italy
Filed May 28, 1962, Ser. No. 198,025
Claims priority, application Italy, May 31, 1961, 10,143/61
18 Claims. (Cl. 260—92.1)

The present invention relates to a new process for preparing homopolymers and copolymers of fluorinated olefins and to the products thus obtained. It relates more particularly to the preparation of polymers of olefins in which all or some hydrogen atoms are substituted only with fluorine, and to copolymers of these olefins with each other and/or with other halogenated olefins.

It is known that fluorine-containing homopolymers and copolymers have numerous important uses, particularly due to their exceptional inertness to chemical agents, their outstanding physical properties and high resistance to solvents.

These properties which render the fluorine-containing homopolymers and copolymers particularly useful for the production of a number of articles possessing excellent physical and chemical stability, are characteristic features of perfluorinated polymeric products, i.e., products containing molecules having only carbon and fluorine atoms, such as, e.g., the polymers of tetrafluoroethylene.

Polytetrafluoroethylene is popular owing to its exceptional physical and chemical properties which make it resistant to heat and to the attack of almost all chemical products.

However, polytetrafluoroethylene, as obtained by conventional polymerization methods, has the disadvantage of possessing an excessively high viscosity in the molten state. Above its crystalline melting point, which is higher than 300° C., the liquid polymer has such a high viscosity that the processes generally used for working and forming thermoplastic polymers (e.g., extrusion, injection molding, etc.) cannot be applied, and in order to shape polytetrafluoroethylene articles, expensive and delicate procedures must be used. Due to the insolubility of polytetrafluoroethylene in a wide range of solvents, processes for applying thin films of perfluorinated polymer onto various materials in order to coat these materials with a protective layer or coating are also particularly difficult to carry out.

Attempts to overcome the inconvenience involved in processing polytetrafluoroethylene have been made, such as introducing monomeric units derived from other fluorinated olefins into the polymer molecules, e.g., by copolymerizing tetrafluoroethylene with hexafluoropropylene or with other fluorinated olefins or diolefins.

Processes of this type, disclosed for instance in U.S. Patents Nos. 2,468,664, 2,479,367, 2,511,258, 2,549,935, 2,946,763, 2,952,669, make it possible to obtain polymeric products which can be worked at high temperatures with rather simpler processing techniques. These copolymerization processes, which are carried out according to the conventional techniques using well-known initiators which decompose with the formation of free radicals (e.g., inorganic persalts, peroxides, hydroperoxides, organic peracids, aliphatic azocompounds and the like), do not, however, allow for the desired introduction into the copolymeric chains of substantial amounts (or even amounts higher than certain narrow limits) of fluorinated monomers different from tetrafluoroethylene. Indeed, if one tries to obtain by these methods a tetrafluoroethylne copolymer having a high content of monomeric units of a higher fluoroolefin (e.g., a content higher than 30-40% by mols), for example, by operating in the presence of an increased monomer phase concentration of the higher fluoroolefin, the conversion to copolymeric product decreases remarkably, and quickly reaches zero. This phenomenon is in accord with the known resistance to polymerization (carried out employing conventional processes) of perfluoroolefins higher than tetrafluoroethylene.

Perfluoropropylene, for instance, is commonly considered as not being capable of homopolymerization (see, e.g., R. M. Adams, F. A. Bokey, J. Polymer Science, 481, 1952; M. Hauptschein, M. Braid, F. E. Lawlor, J. Amer. Chem. Soc., 79, 2549, 1957).

Polymers of perfluoropropylene have been described (e.g., in Italian Patent 594,240), but these have been obtained employing particular polymerization processes, which are far from commercially suitable, due to the high working temperatures, the need for the complete absence of any carbon-to-hydrogen bond in the system (catalyst, solvent), and above all, due to the exceptionally high pressure required (1,000–10,000 atm.).

The polyperfluoropropylenes obtained by this process, in distinction to other known tetrafluoroethylene polymers, are amorphous, lack any trace of crystallinity upon X-ray examination, and are therefore characterized by a high degree of structural and steric disorder in their macromolecules. These polymers therefore suffer a decrease in all the physio-mechanical properties, which are normally necessary in order that a polymer material have a wide application in the field of plastics. Moreover, the only polymer of perfluoropropylene known to date is completely insoluble in the usual solvents and has only a very limited solubility (about 0.5%) in some fluorocarbon solvents. This naturally limits the possibilities of using the polymer, e.g., in coating and impregnation operations.

Like the perfluorinated olefins higher than tetrafluoroethylene, several other partially fluorinated olefins, such as those derived from propylenes wherein one, two, three or more hydrogen atoms in certain positions of the molecule are substituted with an equivalent number of fluorine atoms, are considerably resistant to polymerizations carried out with the conventional free-radical initiators. Thus, polymers obtained from these fluorinated olefins possessing a sufficiently high degree of polymerization are not known.

Upon using 3,3,3-trifluoropropylene, e.g., with the most suitable methods of free radical polymerization, only oily products are obtained (see A. Goldschmidt, J. Amer. Soc. 73, 2940, 1951), i.e., polymers having a very low degree of polymerization, which therefore have little practical importance.

It is to be noted that it has not been possible to apply the usual methods of ionic catalysts to these partially or wholly fluorinated olefins in order to obtain polymeric products having an even relatively high degree of polymerization.

Even the binary catalytic systems, such as those commonly defined as catalysts of the Ziegler-Natta type, which act with a more complex, often stereospecific, mechanism, and are particularly active when applied to the polymerization of alpha-olefins and other types of monomers, do not produce any results when applied to the polymerization of fluoro-substituted olefins. As appears from the abundant scientific literature relating to the use of these catalytic systems, there has not heretofore been disclosed teachings of how to produce, in a practical and reproducible manner, fluorinated polymers using these aforementioned catalytic systems.

It appears, therefore, that, while the possibility of obtaining from fluorinated olefins new homopolymeric or copolymeric products, perhaps possessing new possible uses, is of great interest, there was no polymerization method heretofore available which could be used with this class of monomers in order to obtain the desired results.

It is therefore an object of the present invention to provide certain novel homopolymers and copolymers from fluorine-containing monomers.

A further object of the present invention is to provide a process for producing these polymers.

Other objects and advantages will become apparent hereinafter.

It has now surprisingly been found that by operating in a temperature range between −30° and +150° C., preferably between 0° and 90° C., and under pressures ranging between atmospheric pressure and 60 atm., preferably at autogenic pressure, it is possible to obtain normally solid polymers of totally or partially fluorinated olefins by employing particular catalysts. These catalysts are the products of interaction between a metallorganic compound and a transition metal compound and are normally employed dissolved or dispersed in an organic liquid.

It has also been found that, under these reaction conditions, it is possible to copolymerize partially or totally fluorinated olefins either with each other or with various other monomers of various types and structures.

The attached figure shows a diagram of the infrared absorption spectrum of two polymers of the present invention (curves $a$ and $b$).

According to the present invention, the metallorganic compound is selected from the group consisting of a compound of the formula $AlR'R''R'''$, wherein $R'$, $R''$ and $R'''$ are hydrogen atoms or the same or different alkyl, aryl, alkylaryl, arylalkyl or cycloalkyl radicals; compounds of the formulas: $AlR'R''X'$, $AlR'X'X''$,

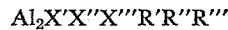

wherein $R'$, $R''$ and $R'''$ have the aforementioned values, and $X'$, $X''$, $X'''$ are halogen atoms, preferably F, Cl, Br; compounds of the formulas: $AlR'R''OR'''$,

$AlR'X'OR'$, wherein $R'$, $R''$, $R'''$ and $X'$ have the aforementioned meaning and O is oxygen. In this latter formula, when $R'$, $R''$ and $R'''$ are bonded to Al through O, they also may contain halogen atoms, particularly fluorine. Preferably $R'$, $R''$ and $R'''$ are hydrogen atoms or lower alkyl groups having from 1 to 6 carbon atoms, either linear or branched, such as methyl, ethyl, n-propyl, isopropyl, n-butyl, isobutyl, n-hexyl, or cycloalkyl groups, such as cyclohexyl, or aryl group such as phenyl tolyl.

Transition metal compounds such as the following may be employed. Compounds having the formula $Mt(OR)_n$, $Mt(OR)_{n-1}X$, $Mt(OR)_{n-2}A_2$, $Mt(OR)_a(OR')_b$, $MtOA_{n-2}$ and $Mt(A)_n$, wherein Mt is the transition metal having the valence $(n)$, O is oxygen, X is a halogen, A represents acetylacetonate, $a+b=$ the valence, $n$, of the metal, Mt R is a lower alkyl or aryl radical and $R'$ is a halogenated alkyl radical. Preferably R is a lower alkyl group having from 1 to 4 carbon atoms or an aryl group selected from the group consisting of methyl, ethyl, propyl, isopropyl, butyl, isobutyl, phenyl, p-tolyl, p-chlorophenyl, p-methoxyphenyl.

The transition metal compounds are preferably compounds such as titanium, vanadium and vanadyl alkoxides and acetylacetonates in which the transition metal can have its maximum valence or a valence lower than its maximum; or the transition metal compound can be a mixture of alkoxides and acetylacetonates of the same or a different transition metal. Compounds in which a halogen is bonded directly to the transition metal, or in which one or more halogenated groups are bonded to the transition metal through oxygen, may also be used.

The selection of the two reactants forming the catalytic system also depends on the particular olefin to be polymerized or copolymerized. For example, while titanium compounds are preferred for the polymerization of perfluoroolefins, vanadium compounds are preferably employed with the partially fluorinated olefins.

According to the present invention, the whole reaction product derived from the components of the catalytic system has a molar ratio of metallorganic compound to transition metal compound higher than 0.1, more particularly a ratio between 1 and 10, preferably between 1 and 6.

The catalytic system is usually prepared by excluding air, moisture and acidic hydrogen-containing substances capable of reacting with the components of the catalytic system. The preparation is conducted in a liquid medium such as aliphatic, aromatic, alkylaromatic or cycloaliphatic hydrocarbons, either halogenated or unhalogenated, esters, amides, nitro and cyanoderivatives and mixtures thereof. Examples of these media include vinyl acetate, N,N-dimethylformamide, nitrobenzene and acetonitrile. The selection of the preferred solvent, however, depends not only on the catalytic system used but also on the type of olefin or olefins to be polymerized. For example, N,N-dimethylformamide is a very good medium for the polymerization of vinylfluoride, while with hexafluoropropene, better results are obtained by using a halogenated solvent like $CH_2Cl_2$.

The same solvent or dispersing liquid medium used for preparing the catalyst can be used as the reaction medium in the polymerization stage. This medium can be miscible or immiscible with the olefin or olefins in the polymerization stage.

If desired, it is also possible to avoid the use of solvents or dispersing liquids by using the olefin to be homopolymerized or one or more of the olefins to be copolymerized directly as the medium in which the catalyst preparation and the subsequent polymerization are carried out.

According to a preferred embodiment, the catalyst is prepared separately by interaction of the catalytic components in the selected liquid medium, at a temperature between 0° and 100° C., preferably between 40° and 80° C., and is then contacted with the olefin or olefins to be polymerized. It is possible, however, to carry out the preparation of the catalyst directly in the presence of the olefin or olefins.

The polymerization is carried out in the absence of atmospheric oxygen, moisture and any substance capable of chemically reacting with the catalyst and thus destroying its activity.

The polymerization system is preferably, but not necessarily, kept under agitation.

The olefins which are homopolymerized or copolymerized according to the present invention may be totally or partially fluorinated. Typical representatives of the class of completely fluorinated olefins are: tetrafluoroethylene $(C_2F_4)$, hexafluoropropylene $(C_3F_6)$ and the higher homologues such as perfluoro-butene, -pentene, -hexene, etc., perfluoroolefins with branched chains such as perfluoroisobutene, perfluorostyrene and with cyclic chains such as perfluoro-cyclobutene and perfluorocyclohexene.

The partially fluorinated olefins, namely, olefins containing one or more fluorine atoms and one or more hydrogen atoms, comprise vinyl fluoride, vinylidene fluoride, 1,2-difluoroethylene, trifluoroethylene, 2-fluoropropylene, 3,3,3,-trifluoropropylene, 2,3,3,3,-tetrafluoropropylene, 1,1,3,3,3,-pentafluoropropylene, and olefins having the general formula, $CF_2=CF—R$, in which R is an aliphatic, aromatic, arylalkyl, alkylaryl or cycloalkyl radical, either halogenated or unhalogenated, such as 1,1,2-trifluoropropylene, 1,1,2 - trifluorohexene-1,$\alpha,\beta,\beta$-trifluorostyrene, etc. Preferably, R is an alkyl group having 1 to 6 carbon atoms, linear or branched, such as methyl, ethyl, propyl, isopropyl, butyl, isobutyl, t-butyl, n-hexyl, or an aryl group such as phenyl or phenyl substituted with halogens, or naphthyl, or alkylaryl such as tolyl or arylalkyl such as benzyl.

The process of the present invention includes the copolymerization of one or more perfluorinated olefins with one or more of the aforementioned olefins belonging to the class of partially fluorinated olefins, and also the copolymerization of one or more totally or partially fluorinated olefins with one or more monomers of a different type. These different type monomers are preferably selected from the class of unsaturated compounds which are partially or totally halogenated and contain or do not contain fluorine atoms, such as, e.g., vinyl or vinylidene chloride or bromide, trifluorochloroethylene, trifluorobromoethylene, 1,1-difluoro, 2,2-dichloroethylene, 3,3,3-trichloropropylene, 2-chloropropylene, halogenated derivatives of butene, isobutene, butadiene, isoprene, styrene, etc., such as 3,4 dichloroperfluorobutene-1; 4,4,4 trichlorobutene-1; 1,1-dichlorobutene-1; 2-trichloromethylpropene; chloroprene; 2-trichloromethyl-butadiene 1–3.

The process of the present invention is particularly useful for obtaining normally solid polymeric products.

As is described in the examples, by applying the polymerization conditions of the present invention to, e.g., a monomeric perfluoropropylene, a white polymeric product is obtained which can be hot pressed into transparent laminae. The polymer is insoluble, e.g., in methanol or ethanol, methylene chloride, petroleum ether, acetone, ethyl ether and carbon disulfide. It possesses a certain solubility in hot organic solvents such as, e.g., carbon tetrachloride, tetrahydrofurane, methyl ethyl ketone and ethyl acetate.

In contrast to previously known products, the polyperfluoropropylene produced according to the present process is demonstrated to be crystalline by X-ray examination. The distance between the lattice planes corresponding to the more indicative reflexes which appear in a powder spectrum are listed in the following table; these distances between the lattice plans correspond to the more intense and significant reflections which appear in a powder spectrum determined with a Geiger counter.

SPECTRUM OF PERFLUOROPROPYLENE POWDERS

| Intensity: | $d$ (A.) |
| --- | --- |
| Very strong | 6.14 |
| Medium | 5.10 |
| Very weak | 4.20 |
| Weak | 3.53 |
| Medium (diffused) | 2.20 |

The crystalline melting point, determined with a polarizing microscope on samples of crude polyhexafluoropropylenes, as directly obtained by polymerization, is higher than 110° C.

The molten polymer, after quenching, possesses a good recrystallization rate.

The characterization of polyhexafluoropropylene is made easy by comparing the infrared absorption spectra in the zones of the carbon-to-fluorine valence vibrations (see the figure, curve $a$, continuous line). The more characteristic absorption peaks appear at the frequencies of 1290, 1270, 1200, 1120 (flex) 1090–1080, 1030, 1010 cm.$^{-1}$. In the accompanying figure is shown the corresponding curve.

Upon employing the catalytic systems and the operative conditions of the process of the present invention, tetrafluoroethylene gives solid polymers, having a high crystallinity and a high crystalline melting point, which are substantially insoluble in the common organic solvents.

By subjecting mixtures of tetrafluoroethylene with a higher perfluoroolefin, such as perfluoropropylene to the same polymerization conditions, copolymeric products having properties varying within wide limits, which properties depend on the resulting composition of the copolymer, are obtained. A decrease in the content of combined tetrafluoroethylene units decreases the crystallinity, the crystalline melting point, the softening temperature and the molten state viscosity of the copolymer, while the solubility of the polymer in organic solvents increases.

The polymerization process of the present invention is particularly useful because it also makes it possible to obtain homopolymeric or copolymeric products from only partially fluorinated olefins. For example, from 3,3,3-trifluoropropylene, a polymer is obtained in the form of a white powder which can be hot molded into transparent laminae.

Poly-3,3,3-trifluoropropylene is insoluble in and is not swollen in even hot aliphatic hydrocarbons. It is practically insoluble in $CCl_4$, benzene, ethyl ether and still has a certain solubility in organic solvents, such as, e.g., tetrahydrofurane, acetone and higher ketones.

This poly-3,3,3-trifluoropropylene is easily characterized by its infrared absorption spectrum in the vibration zone of the carbon-to-fluorine bonds. The most significant absorption peaks are at the frequencies of 1250, 1165, 1190, 1020 cm.$^{-1}$. See the figure (curve $b$, dotted line) for the corresponding curve.

The catalysts of the present invention, which are derived from certain metallorganic compounds of a highly electropositive element and certain transition metal compounds, find new and important uses in the preparation of a wide series of fluorine-containing copolymers obtained by copolymerization of completely or partially fluorinated olefins with each other or with other monomers either halogenated or unhalogenated. The copolymeric products thus obtained have new properties that can be varied as desired, depending on the structure of the monomer used and on the ratio between the comonomers.

According to a feature of this invention, the fluorine-containing olefin or olefins are copolymerized with a monomer preferably selected from halogenated olefins containing at least one halogen atom different from fluorine. Typical examples of these preferred comonomers are: vinyl chloride, vinylidene chloride, vinyl bromide, vinylidene bromide, 1,1-chlorofluoroethylene, trifluorochloroethylene, trifluorobromoethylene, 1,1-dichloro-2,2-difluoroethylene, 2-chloropropylene, 3,3,3-trichloropropylene.

The partially or completely fluorinated olefins can be copolymerized in monomeric mixtures containing them in proportion of 1 to 99% by mols, the remaining portion consisting of 1 or more of the aforementioned halogenated olefins.

Some of the catalyst compounds used in the following examples are new per se and are prepared according to the methods given below.

*Preparation of* $Ti(O\ i-C_3H_7)_2A_2$ (*wherein A represents the acetylacetonate group*)

Into a 50-cc. three-necked flask provided with: (1) a side opening for introducing nitrogen, (2) a mechanical stirrer, (3) a dropping funnel and (4) a distillation adapter with 150 x 10 Vigreaux column, containing 14.2 cc. of $Ti(O-iC_3H_7)_4$ (0.05 mol), there is slowly added in a dropwise manner 9.7 g. of $CH_3-CO-CH_2-COCH_3$ (0.1 mol). The exothermic reaction is kept at 70° and the temperature is then brought to 100–130° C. and isopropyl alcohol is removed by distillation.

The product obtained is then distilled at 107–110° (10$^{-4}$ mm. Hg). This product has $d_4^{20}=1.08$ and a clear yellow color.

*Preparation of* $Al(i-C_4H_9)\ (OC_4H_3F_6)Cl$ 5 ml. of $Al(iC_4H_9)_2Cl$ (0.025 mol) in 40 cc. of benzene are placed in a 100-cc. three-necked flask kept under dry nitrogen and provided with a mechanical agitator, a dropping funnel and a distillation adapter with a 150 mm. Vigreaux column. 3.25 cc. of $CF_3-CFH-CF_2-CH_2OH$ are slowly added thereto in a dropwise manner for 1 hour at 20° C. After refluxing for 1 hour, the solvent and isobutane are evaporated and $Al(iC_4H_9)$ $(OC_4H_3F_6)Cl$ is then distilled at 95–96° C. (10⁻⁴ mm. Hg) in the form of a colorless liquid having $d_4^{20}=1.34$ and a Cl content of 11.6% (theoretical 11.8%).

*Preparation of Ti(O i-C₃H₇) (OCH₂—CF₂—CFH—CF₃)₃*

In the same apparatus used for preparing the above Ti(O i-C₃H₇)₂A₂, a solution of 7 cc. of $$CF_3—CFH—CF_2—CH_2OH$$

in 10 cc. of benzene is added to a solution of 3 cc. of Ti(O i-C₃H₇)₄ in 10 cc. of benzene kept hot so as to allow the distillation of the benzene-alcohol mixture. The residue is then diluted twice with 10 cc. portions of benzene which are evaporated each time. The excess fluorinating alcohol is finally evaporated.

The reaction product is then distilled, by collecting the fraction at 105°–107° C. (10⁻⁴ mm. Hg) consisting of a highly viscous colorless liquid having a Ti content of 7.4% (theoretical=7.37%).

The following examples illustrate the invention without limiting its scope. All parts and proportions are by weight unless otherwise indicated.

EXAMPLE 1

A solution of 1.45 g. of titanium tetraisopropylate in 10 cc. of methylene chloride is introduced into a 50 cc. glass flask provided with an agitator, a dropping funnel and a reflux-condenser, and kept under dry nitrogen.

10 cc. of methylene chloride containing in solution 0.02 mol of triisobutyl aluminum are then added dropwise to the solution within 10 minutes and at a temperature of 40° C.

17 cc. of the resulting brown suspension are placed, after excluding air therefrom, in a glass vial which is sealed under nitrogen and is placed in a thermostatic bath at the temperature of 60° C. for a period of 15 minutes. After cooling, the contents of the vial are introduced into a previously evacuated stainless steel 330 cc. oscillating autoclave.

230 g. of monomeric hexafluoropropylene are then introduced. The polymerization is continued for 15 days at the temperature of 30° C. and for 9 days at the temperature of 40° C.

After this period, the unreacted monomer is recovered and the contents of the autoclave are poured into an excess of methanol acidified with nitric acid.

The precipitated polymer is isolated, washed with methanol and dried at 60° C. under a high vacuum.

3.10 g. of solid polyperfluoropropylene, in the form of a white powder, are obtained. The polymer is demonstrated to be crystalline under X-ray examination.

The temperature at which the complete disappearance of the crystallinity takes place, as determined with the hot-stage polarizing microscope, is between 110° and 115° C.

One gram of polyperfluoropropylene, obtained as described above, is dissolved in 50 cc. of hot carbon tetrachloride. The solution is filtered and poured, while agitating, into 100 cc. of methanol. The precipitated polymer is filtered, washed with methanol and dried. It has a melting temperature between 130° and 135° C. The polymer thus obtained is subjected to extraction with boiling n-heptane and an insoluble fraction is separated. The final melting point of this fraction is between 170–175° C.

EXAMPLE 2

20 cc. of CH₂Cl₂, containing in solution 10×10⁻³ mols of Ti(Oi-C₃H₇)₄ to which has been added while agitating, 20 cc. of CH₂Cl₂ containing 35×10⁻³ mols of $$Al(i-C_4H_9)_2Cl$$

dissolved therein, are introduced into a 50-cc. glass vial under dry nitrogen at room temperature. The vial is sealed and heated in a thermostatic bath to 60° C. for 30 minutes.

The vial is then cooled to room temperature and opened under nitrogen. 4 cc. of the resulting brown-red suspension are taken by means of a syringe and introduced into a 15-cc. glass vial, dried and kept under nitrogen. In this vial, after cooling to −80° C., 6 g. of monomeric perfluoropropylene are condensed. The vial is sealed and the polymerization reaction is operated for 210 hours at 50° C. At the end of the reaction, the vial is opened and the polymer formed is precipitated with an excess of methanol. The polymer is then washed with methanol, acidified with nitric acid and is finally vacuum dried to constant weight.

0.15 g. of a solid white polymer, soluble in the chlorinated hydrocarbon (e.g., CCl₄) and reprecipitable from methanol, are obtained. The polymer can be molded at about 100° C. into transparent laminae.

Under X-ray examination it appears to have a high degree of crystallinity (more than 30–40% ca of polymer is crystallized).

EXAMPLE 3

1.5 cc. of a catalytic suspension, prepared as in the preceding example, are placed in a 15-cc. glass vial kept under dry nitrogen. This catalyst is formed of diisobutyl-aluminum monochloride and of a mixture of titanium alcoholate and vanadyl acetylacetonate and is obtained by adding a small amount of said vanadylacetonate to the catalyst of Example 2.

5 cc. of CH₂Cl₂ containing 0.5×10⁻³ mols of vanadyl acetylacetonate are then added and, after cooling the vial to −80° C. and having applied vacuum, 5 g. of perfluoropropylene are condensed therein. The vial is sealed and kept at 30° C. for 280 hours.

At the end of the polymerization, by employing the procedure of the above example, 0.10 g. of solid white polyperfluoropropylene, which is demonstrated to be crystalline by X-ray examination, are obtained.

EXAMPLE 4

2.0×10⁻³ mols of titanium tetraisopropylate dissolved in 5 cc. of chlorobenzene and 5.0×10⁻³ mols of isobutyl aluminum dichloride in 10 cc. of chlorobenzene are introduced under nitrogen and at room temperature into a 30 cc. glass vial.

The vial is cooled to −80° C. and 10 g. of monomeric perfluoropropylene are condensed therein. The vial is sealed and the reaction is continued at 25° C. for 12 days. It is then cooled to −80° C., opened and its contents poured into excess methanol acidified with hydrochloric acid. The polymer is isolated, washed with methanol and dried under vacuum. 90 mg. of a solid white product, which is demonstrated to be crystalline by X-ray examination and has a crystalline melting temperature of 113–114° C., are obtained.

EXAMPLE 5

6 cc. of methylene chloride containing in solution 0.22 g. of titanium tetraisopropylate are introduced under dry nitrogen at 40° C. into a 20 cc. glass vial. A solution of AlCl(i-C₄H₉)₂ in methylene chloride is added to reach an Al/Ti molar ratio of 3.8. The vial contains a total of 12 cc. of solvent. It is cooled to the temperature of liquid air and after the application of vacuum, 3.9 g. of tetrafluoroethylene are condensed therein. The vial is sealed and kept at 15° C. for 254 hours. At the end of this period of time the vial is cooled with liquid air and is opened. The unreacted monomer is removed. The contents of the vial are poured into an excess of methanol acidified with nitric acid.

The polymer thus separated is isolated, washed with methanol and vacuum dried at 70° C. to a constant weight.

0.24 g. of polytetrafluoroethylene are thus obtained. The polymer is a white solid, which is insoluble in carbon tetrachloride, toluene, cyclohexanone and boiling tetrahydronaphthalene and shows very high crystallinity upon X-ray examination.

EXAMPLE 6

4 cc. of the catalytic suspension prepared as described in Example 2 are placed into a 20-cc. glass vial under nitrogen. The vial is then cooled to the temperature of liquid air, vacuum is applied and 6 g. of perfluoropropene and 4 g. of tetrafluoroethylene are condensed therein so as to obtain an equimolar mixture of the two olefins.

The vial is sealed and kept at 15° C. for 254 hours. After this time, it is opened and, by employing the usual methods, 0.23 g. of amorphous polymeric product, which is partially rubbery, are isolated after drying.

The product is slightly soluble in the normal solvents for poly(perfluoropropylene) and can be molded into transparent laminae below 100° C. An analysis of the infrared absorption spectrum confirms the presence in the chain of monomeric units derived from both perfluorinated olefins.

EXAMPLE 7

$3 \times 10^{-3}$ mols of titanium tetraisopropylate and $7.5 \times 10^{-3}$ mols of diisobutyl aluminum monochloride dissolved in 8 cc. of n-heptane are introduced at room temperature into a 20-cc. glass vial, under nitrogen. After cooling, 6 g. of tetrafluoroethylene and 6 g. of perfluoropropylene are condensed therein so as to obtain a monomeric mixture containing 60% by mols of perfluoroethylene.

The vial is sealed and kept at 10° C. for 600 hours. At the end of the polymerization, by the usual methods, 0.11 g. of a solid polymeric product, which can be molded into transparent laminae and is crystalline upon X-ray examination, are obtained. An examination of the infrared absorption spectrum for this product confirms the presence of combined units of both olefins.

EXAMPLE 8

5 cc. of $CH_2Cl_2$, 0.13 g. of diisobutyl aluminum monohydride and 0.085 g. of titanium tetraisopropylate are introduced into a 15-cc. glass vial under dry nitrogen. The vial is sealed and heated to 60° C. for 10 minutes.

Into the same container, opened after cooling to —80° C., 3.5 g. of 3,3,3-trifluoropropene monomer are condensed. The vial is sealed and heated to 40° C. for 7 days. At the termination of the polymerization, after cooling to —80° C. and opening the vial, the unreacted monomer is removed and the polymer formed is coagulated with methanol acidified with nitric acid.

The product is then filtered, washed with methanol and vacuum dried to constant weight: 0.25 g. of poly-(3,3,3-trifluoropropene) are obtained in the form of a white powder which can be molded at a temperature above 100° C. into transparent laminae.

EXAMPLE 9

A run similar to that of the preceding example is carried out by using as catalytic reactants $0.25 \times 10^{-3}$ mols of vanadyl acetylacetonate and $0.75 \times 10^{-3}$ mols of monoethoxy monoethyl aluminum monochloride $$[Al(C_2H_5)(OC_2H_5)Cl]$$

The polymerization gives 0.25 g. of poly(3,3,3-trifluoropropene) having properties similar to those of the polymer obtained in the preceding example.

EXAMPLE 10

Under conditions similar to those of the two preceding examples, the polymerization is carried out using as catalytic reactants $0.5 \times 10^{-3}$ mols of vanadyl acetylacetonate and $1.5 \times 10^{-3}$ mols of diethyl aluminum monofluoride.

0.35 g. of white poly (3,3,3-trifluoropropene), insoluble in boiling n-heptane and in hot methylethylketone, and 0.16 g. of polymer having a semisolid consistency, which is soluble in hot methanol, are obtained.

EXAMPLE 11

5 cc. of n-heptane containing in solution 0.40 g. of titanium tetraisopropylate and 5 cc. of a solution of diisobutyl aluminum chloride in n-heptane, which is added so as to reach an Al/Ti molar ratio of 2.5, are introduced into a 30-cc. glass vial under nitrogen at room temperature. Into the vial cooled to —80° C. 7.5 g. of hexafluoropropylene and 4.6 g. of vinyl chloride are condensed. The monomeric mixture thus contains 40% by mols of $C_3F_6$. The vial is vacuum sealed and kept at 36° C. for 68 hours.

At the end of the reaction, by employing the usual methods, 1.4 g. of a polymeric product are recovered in the form of a white powder.

By analysis it is shown to contain 53.6% of chlorine and 4.6% of fluorine, corresponding to a content of about 6% by weight of perfluoropropylene units combined in the copolymer.

The copolymer, which by X-ray examination shows the presence of crystallinity, is soluble in tetrahydrofurane, chloroform, toluene, aliphatic ketones, esters, etc. The copolymer has an intrinsic viscosity, determined in cyclohexanone at 30° C., of $[\eta]=0.45(100$ cc./g.).

This product is molded into transparent laminae when pressed between two plates at a temperature higher than about 150° C.

EXAMPLE 12

A catalytic suspension is prepared in a 20-cc. glass vial at 40° C. by mixing under an inert gas, 0.050 g. of titanium tetraisopropylate and 0.22 g. of diisobutylaluminum monochloride, in 2 cc. of methylene chloride. The vial is cooled to —80° C. and 6.2 g. of 3,3,3-trichloropropene and 6.7 g. of 3,3,3-trifluoropropene are introduced therein, thus obtaining a monomeric mixture containing about 60% by mols of 3,3,3-trifluoropropene.

The vial is sealed and placed for the reaction in a thermostatic bath at 36° C. for 10 days.

At the end of the reaction, 0.95 g. of a white polymeric product, which can be pressed into transparent laminae and appears amorphous under X-ray examination, are obtained.

The chlorine-fluorine analysis shows that the copolymer contains 24% by mols of combined 3,3,3-trifluoropropene and 76% by mols of combined 3,3,3-trichloropropene.

EXAMPLE 13

A catalyst is prepared in a 20-cc. glass vial at 40° C. under dry nitrogen, by the interaction of $2 \times 10^{-3}$ mols of titanium tetramethylate and $6 \times 10^{-3}$ mols of diisobutyl aluminum monochloride in the presence of 5 cc. of methylene chloride. Into the vial cooled to —80° C. 4.2 g. of a mixture consisting of 60% by mols of vinyl chloride and 40% by mols of 3,3,3-trifluoropropylene are condensed. The vial is sealed and the copolymerization reaction is continued at 40° C. for 8 days while agitating.

At the end of this reaction, by the usual methods, 2.1 g. of a copolymeric product, which upon analysis is shown to contain 88% by weight of vinyl chloride and 12% of 3,3,3-trifluoropropylene are obtained.

The copolymer is insoluble in ethyl ether, carbon tetrachloride and n-heptane and is soluble in hot tetrahydrofurane and benzene. It can be hot pressed into transparent laminae.

EXAMPLE 14

10 cc. of methylene chloride, $2 \times 10^{-3}$ mols of titanium tetraisopropylate and $6 \times 10^{-2}$ mols of diisobutyl aluminum monochloride are introduced under dry nitrogen at a temperature of 40° C., while agitating, into a reaction apparatus composed of a 50-cc. glass flask provided with a dropping funnel, agitator and reflux condenser. The catalytic suspension thus prepared is maintained so as to allow the slow boiling of methylene chloride for 15 minutes. At the end, the contents are cooled to 20° C. and 10 cc. of α,β,β-trifluorostyrene monomer are introduced.

The polymerization is carried out at room temperature for 5 days and is then stopped by introducing an excess of methanol acidified with nitric acid. The coagulated polymer is filtered, washed with methanol and vacuum dried at 100° C. 1.12 g. of poly(α,β,β-trifluorostyrene) are obtained in the form of a white powder, which can be pressed into brittle transparent laminae at a temperature higher than 180° C.

EXAMPLE 15

$0.5 \times 10^{-3}$ mols of titanium tetraisopropylate, 3 cc. of methylene chloride and $1.5 \times 10^{-3}$ mols of diisobutyl aluminum monohydride are introduced into a 10-cc. glass vial under nitrogen at a temperature of 40° C.

The vial is cooled to $-80°$ C. and 2.1 g. of monomeric 2-fluoropropylene are condensed therein.

The vial is then sealed and the polymerization is continued for 2 days at 20° C. After this time, by the usual methods, 0.25 g. of a white solid polymer, insoluble in methanol, ethanol and carbon tetrachloride are recovered.

EXAMPLE 16

$1 \times 10^{-3}$ mols of $(C_5H_7O_2)_2Ti(O\ i\text{-}C_3H_7)_2$ (titanium diisopropylate diacetylacetonate) dissolved in 2.5 cc. of methylene chloride, are introduced under dry nitrogen into a 20-cc. glass vial.

$3 \times 10^{-3}$ mols of $$Al(i\text{-}C_4H_9).(OCH_2\text{---}CF_2\text{---}CFH\text{---}CF_3)Cl$$

(aluminum 1,1,3-trihydro-hexafluorobutoxide monoisobutyl monochloride) dissolved in 2.5 cc. of methylene chloride are then added at the temperature of 40° C.

The vial is cooled to $-80°$ C. and 2.5 g. of perfluoropropylene are introduced by distillation. The vial is sealed and kept for 7 days immersed in a bath maintained at the temperature of 40° C. After this period the vial is cooled and broken and the contents are poured into an excess of methanol acidified with hydrochloric acid.

After filtration, washing with hot methanol and drying, 0.11 g. of polyperfluoropropylene in the form of a white powder are obtained. The polymer is highly crystalline as demonstrated by X-ray examination and has a crystalline melting temperature (temperature at which there occurs the complete disappearance of crystallinity) higher than 135° C.

EXAMPLE 17

Under the conditions of Example 16, a catalyst obtained from $1 \times 10^{-3}$ mols of $$Ti(O\ i\text{-}C_3H_7).(OCH_2\text{---}CF_2CFH\text{---}CF_3)_3$$

and $2 \times 10^{-3}$ mols of $Al(i\text{-}C_4H_9)$ is used.

0.12 g. of polyperfluoropropylene having a crystalline melting temperature higher than 130° C. are obtained.

EXAMPLE 18

Under the conditions of Example 16, a catalyst obtained from $1 \times 10^{-3}$ mols of $TiCl(O\ i\text{-}C_3H_7)_3$ and $2 \times 10^{-3}$ mols $Al(i\text{-}C_4H_9)_3$ is used.

0.10 g. of crystalline polyperfluoropropylene are obtained as the residue from the extraction with boiling methanol.

EXAMPLE 19

Into a 25-cc. glass flask, provided with an agitator and a dropping funnel for charging the reactants, which is kept under dry nitrogen and contains 0.07 g. of $Vo(C_5H_7O_2)_2$ (vanadyl acetylacetonate) dissolved in 5 cc. of methylene chloride, a solution of $Al(i\text{-}C_4H_9)_2F$ in methylene chloride is slowly added at room temperature, while agitating so as to reach an Al/V molar ratio of 3 and a total volume of 8 cc.

The mixture is kept at 40° C. for 15 minutes and the contents of the flask are then introduced under an inert gas into a 20-cc. glass vial.

After cooling to the temperature of liquid nitrogen, 2.0 g. of vinyl fluoride are introduced by distillation into the vial.

The vial is sealed and then immersed in a bath kept at 20° C. for 300 hours. The contents of the vial are poured into an excess of methanol acidified with a little nitric acid.

After allowing it to stand for several hours, the precipitated polymer is filtered, washed with methanol and dried.

0.45 g. of polyvinylfluoride are obtained in the form of a white powder. The polymer is highly crystalline, as demonstrated by X-ray examination, and can be molded at 200–250 °C. into transparent laminae.

EXAMPLE 20

A catalyst is prepared at 40° C. according to the procedures of the preceding example, from (a) $1 \times 10^{-3}$ mols of canadyl acetylacetonate and (b) $3 \times 10^{-3}$ mols of $Al(i\text{-}C_4H_9).(O\ i\text{-}C_4H_9)Cl$ in 18 cc. of N,N-dimethylformamide, which are introduced under an inert gas into a 50-cc. metal bottle.

4.5 g. of vinyl fluoride are then introduced by distillation at low temperature.

The polymerization is carried out at 40° C. for 90 hours. By employing the usual separation methods, 2.2 g. of white polyvinyl fluoride, which is insoluble in boiling methanol and has an intrinsic viscosity of 0.13 (100 cc./g.) (determined in cyclohexanone at 135° C.), are obtained.

The polymer is subjected to a series of extractions with various boiling solvents as shown below.

The crystalline melting temperature of the extracted fractions, as reported in the following table, is determined by using a polarizing microscope.

| Solvent | Fraction, Percent | Crystalline melting temperature ° C |
|---|---|---|
| Ethanol | 10 | 125–130 |
| Tetrahydrofurane | 40 | 140–145 |
| Cyclohexanone (at 100° C.) | 20 | 185–190 |
| Residue (soluble in cyclohexanone at 135° C.) | 30 | 202–207 |

Upon examining the X-ray diffraction spectra of the various fractions of polyvinylfluoride, it is noted that the crystallinity increases remarkably as the melting temperature increases.

EXAMPLE 21

0.04 g. of vanadyl acetylacetonate dissolved in 2 cc. of $CH_2Cl_2$ are introduced under an inert gas into a 20-cc. glass vial at room temperature. A further 2 cc. of the same solvent containing $0.75 \times 10^{-3}$ mols of dissolved $Al(i\text{-}C_4H_9)(O\ i\text{-}C_4H_9)Cl$ are then added.

The reaction between the two catalytic reactants is completed by keeping the vial content under agitation for 15 minutes at 40° C. Then 1 g. of vinyl fluoride is distilled into the vial cooled with liquid air.

The vial is sealed and kept at 20° C. for 240 hours. After this time, by the usual separatory methods, 0.4 g. of polyvinyl fluoride are obtained in the form of a white powder which can be molded into thin transparent laminae at a temperature higher than 200° C.

EXAMPLE 22

By operating according to the procedures of the preceding example, but by using, as the organic aluminum compound, aluminum isobutyl isobutoxide monofluoride, $(Al(i\text{-}C_4H_9)(O\ i\text{-}C_4H_9)F)$, 0.5 g. of a polyvinyl fluoride, which is insoluble in methanol and insoluble to the extent of 75% in boiling tetrahydrofurane, are obtained.

EXAMPLE 23

2.5 cc. of methylene chloride containing in solution $0.5 \times 10^{-3}$ mols of vanadyl acetylacetonate and 2.5 cc. of the same solvent containing $1.5 \times 10^{-3}$ mols of $$Al \cdot F \cdot (i\text{-}C_4H_9) \cdot (OCH_2\text{---}CF_2\text{---}CHF\text{---}CF_3)$$

are mixed under an inert gas at room temperature in a 20-cc. glass vial.

The reaction between the two catalytic reactants is completed by heating to 40° C. for 15 minutes. The vial is then cooled to the temperature of liquid nitrogen and 2 g. of vinyl fluoride are introduced by distillation.

The vial is sealed and the polymerization is carried out at 20° C. for 240 hours.

At the end of the reaction, by employing the usual separatory methods, 0.6 g. of polyvinyl fluoride, which is the residue from the extraction with boiling methanol, are obtained.

70% of this polymer is insoluble in hot tetrahydrofurane and has a crystalline melting temperature of 205–207° C.

EXAMPLE 24

Into a 100-cc. autoclave there is introduced a catalyst prepared at 40° C. from 0.27 g. of vanadyl acetylacetonate and $3 \times 10^{-3}$ mols of $Al(i\text{-}C_4H_9) \cdot (O\ i\text{-}C_4H_9) \cdot Cl$ in 20 cc. of methylene chloride. Vinyl fluoride is then introduced into the autoclave up to a pressure of 15 atm.

The whole mass is kept at room temperature, while agitating, for a period of 3 days, during which time the pressure decreases slowly to 8 atm.

At the end of the reaction, the residual gas is discharged, and the contents of the autoclave are poured into methanol acidified with $HNO_3$, then filtered and washed with methanol. After drying, 1.9 g. of polyvinyl fluoride, which is highly crystalline as demonstrated by X-ray examination, are obtained. The raw polymer has an intrinsic viscosity of 0.13 (100 cc./g.), as determined in cyclohexanone at 135° C.

EXAMPLE 25

There is introduced into a 20-cc. glass vial under nitrogen, 2 cc. of a 0.5 molar solution of titanium tetraisopropylate in methylene chloride and then, slowly at room temperature, a molar solution of aluminum triisobutyl in $CH_2Cl_2$ until an Al/Ti molar ratio of 2 is reached.

The vial contents are kept at 40° C. for 30 minutes and then, by distillation at room temperature, 2.0 g. of 1,1,3,3,3-pentafluoropropylene are introduced.

The vial is sealed and placed in a bath kept at 40° C. for 200 hours. Then, by pouring the contents of the vial into acidified methanol, filtering, washing with hot methanol and drying, 0.15 g. of a white polymer, which can be hot molded into transparent laminae, are obtained.

EXAMPLE 26

$0.5 \times 10^{-3}$ mols of $Ti(OCH_3)_4$ and $1.5 \times 10^{-3}$ mols of $Al(i\text{-}C_4H_9)_2Cl$ in 4 cc. of methylene chloride are placed in a glass vial at 40° C. under dry nitrogen.

After 15 minutes, 3.0 g. of $CF_2=CF\text{---}C_4H_9$ are introduced. The vial is sealed and the polymerization is carried out at 40° C. for 5 days.

At the end of the polymerization, by the usual separatory methods, 0.11 g. of poly-(1,1,2-trifluorohexene-1), which is insoluble in hot methanol and is easily hot molded into transparent flexible laminae, are obtained.

EXAMPLE 27

$0.5 \times 10^{-3}$ mols of vanadyl acetylacetonate and $1.5 \times 10^{-3}$ mols of $Al(i\text{-}C_4H_9)(O\ i\text{-}C_4H_9)Cl$ in 8 cc. of methylene chloride are reacted in a 20-cc. glass vial for 15 minutes at 40° C. under dry nitrogen.

After cooling to the temperature of liquid nitrogen, 2.0 g. of vinylidene fluoride are introduced by distillation. The vial is sealed and kept at 20° C. for 10 days. At the end of this period, the vial is cooled and broken and its contents are poured into an excess of methanol acidified with nitric acid.

After filtration, washing with hot methanol and drying, 0.21 g. of polyvinylidene fluoride, in the form of a white powder, is obtained. The polymer is highly crystalline, as shown by X-ray examination, and has a crystalline melting point higher than 170° C. It is soluble in hot tetrahydrofurane, methylethylketone and dimethylformamide and insoluble in ether, benzene, n-hexane carbon tetrachloride and methylene chloride.

EXAMPLE 28

Under the conditions of the preceding example, 2.0 g. of vinylidene fluoride are subjected to polymerization in the presence of a catalyst obtained from $0.5 \times 10^{-3}$ mols of vanadyl acetylacetonate and $2.5 \times 10^{-3}$ mols of $$Al(i\text{-}C_4H_9)(OCH_2\text{---}CF_2\text{---}CHF\text{---}CF_3)F$$

in 8 cc. of methylene chloride.

0.25 g. of a polymer, having properties similar to those described in the preceding example, are obtained.

EXAMPLE 29

2 cc. of a 0.25 molar solution of vanadyl acetylacetonate in methylene chloride and 3 cc. of a 0.5 molar solution of $Al(i\text{-}C_4H_9)(O\ i\text{-}C_4H_9)Cl$ in methylene chloride are mixed in a 20-cc. glass vial under dry nitrogen at room temperature.

A further 3.5 cc. of $CH_2Cl_2$ are introduced. The vial is cooled to the temperature of liquid nitrogen and 1.93 g. of vinyl chloride and 1.44 g. of vinyl fluoride are introduced by distillation.

The vial is then sealed and kept at 20° C. for 7 days. After this period, the vial is cooled, opened and its contents poured into an excess of methanol acidified with nitric acid. The precipitated polymer is filtered, washed with hot methanol and dried at 50° C. under vacuum.

1.9 g. of a white polymeric product, having an intrinsic viscosity of 0.36 (100 cc./g.), (determined in methylethylketone at 30° C.) are obtained.

Analysis shows that the product contains about 8% by mols of combined vinyl fluoride units, the rest consisting of vinyl chloride units.

The copolymer is easily molded at temperatures higher than 150–170° C. into transparent flexible laminae.

The copolymer is soluble in various solvents, such as, e.g., tetrahydrofurane, methylethylketone, N,N-dimethylformamide; and it is insoluble in n-heptane, benzene and in halogenated aliphatic derivatives.

On comparing the infrared absorption spectrum of this copolymer with that of pure polyvinylchloride, it is noted that two absorptions are observed, at between 9.75 and $10\mu$ and at $12.2\mu$, these being derived from the vinyl fluoride units present in the polymeric chain.

EXAMPLE 30

Under the conditions of the preceding example, 0.031 mol of vinyl chloride of 0.031 mol of vinylidene fluoride are copolymerized.

1.7 g. of a white polymeric product, which can be hot molded into flexible transparent laminae, are obtained.

Analysis of the fluorine and chloride contents of this product shows that the copolymer consists of 4% by mols of vinylidene fluoride and 96% by mols of vinyl chloride.

The copolymer has an intrinsic viscosity of 0.29 (100 cc./g.), as determined in methylethylketone at 30° C.

EXAMPLE 31

By operating under the conditions of the preceding example, but by diluting the catalytic system with a further 5 cc. portion of methylene chloride, 1.44 g. of vinylfluoride and 2.00 g. of vinylidene fluoride are polymerized.

0.60 g. of a polymeric product, which is insoluble in methylethylketone, which can be hot molded into transparent laminae and which has an intrinsic viscosity of 0.12 (100 cc./g.) (determined in N,N-dimethylformamide at 30° C.), are obtained.

Analysis of the fluorine content shows that the copolymer has a vinylidene fluoride content of 13% by mols.

As compared with the infrared absorption spectrum of pure polyvinylfluoride, the spectrum of the copolymer obtained shows absorptions at 7.70, 8.30 and 11.35$\mu$, which are due to the vinylidene fluoride units.

Many variations and modifications can, of course, be practiced without departing from the spirit and scope of the present invention.

Having thus described the invention, what it is desired to secure and claim by Letters Patent is:

1. A process for preparing fluorine-containing olefin polymers which comprises polymerizing a monomer feed material selected from the group consisting of monomers and monomeric mixtures containing at least one fluoro-monoolefin containing from about 2 to 8 carbon atoms at a temperature between −30° C. and 150° C. under a pressure between atmospheric pressure and 60 atmospheres in the presence of a catalyst obtained from the reaction of an organo aluminum compound and a transition metal compound selected from the group consisting of compounds of the formula $Mt(OR)_n$, $Mt(OR)_{n-1}X$, $Mt(OR)_{n-2}Ac_2$, $Mt(OR)_a(OR')_b$, $MtOAc_{n-2}$, and, $Mt(Ac)_n$,
wherein Mt is the transition metal having a valence $n$, and is selected from the group consisting of titanium and vanadium; $a+b=n$;
O is oxygen;
X is halogen;
Ac represents the acetylacetonate group;
R is selected from the group consisting of lower alkyl and aryl groups; and
R' is a halogen-containing alkyl radical.

2. The process of claim 1, wherein the polymerization is conducted at a temperature between 0° and 90° C. under autogenous pressure.

3. The process of claim 1, wherein said catalyst is present in an organic liquid selected from the group consisting of aliphatic hydrocarbons, aromatic hydrocarbons, alkylaromatic hydrocarbons, cycloaliphatic hydrocarbons, halogenated aliphatic hydrocarbons, halogenated aromatic hydrocarbons, halogenated alkylaromatic hydrocarbons, halogenated cycloaliphatic hydrocarbons, esters, amides, nitroaromatics, and nitriles.

4. The process of claim 1, wherein the organo aluminum compound is selected from the group consisting of compounds of the formula, $AlR_3$, $AlR_2X$, $AlRX_2$ and $Al_2X_3R_3$, wherein R is selected from the group consisting of hydrogen atoms, alkyl, aryl, alkylaryl and cycloaliphatic groups, and X represents a halogen atom.

5. The process of claim 1, wherein the organo aluminum compound is selected from the group consisting of compounds of the formula, $AlR_2OR$, $AlR(OR)_2$ and $AlRXOR$, wherein R represents a member selected from the group consisting of hydrogen atoms, alkyl, aryl, alkylaryl and cycloaliphatic radicals, X represents a halogen atom, and O is oxygen.

6. The process of claim 5, wherein when R is bonded to the aluminum through an oxygen atom, said R containing at least one halogen atom.

7. The process of claim 1, wherein the transition metal compound is a mixture of an alkoxide and acetylacetonate of titanium and vanadium.

8. The process of claim 1, wherein the catalyst has a molar ratio of organo aluminum compound to transition metal compound between 0.1 and 10.

9. The process of claim 1, wherein the catalyst is prepared in a liquid medium selected from the group consisting of aliphatic, aromatic, cycloaliphatic and alkylaromatic hydrocarbons, halogented derivatives thereof, esters, ethers, amides, nitro-derivatives, and mixtures thereof.

10. The process of claim 1, wherein the monomer feed material contains a fluoro-olefin wherein at least one of the hydrogen atoms is substituted with a fluorine atom.

11. The process of claim 1, wherein the monomer feed material is a mixture of at least two fluoro-olefins.

12. The process of claim 1, wherein the monomer feed is a mixture of at least one fluoro-olefin and at least one halogenated olefin containing at least one halogen atom different from fluorine.

13. The process of claim 1, wherein the monomer feed material contains at least one completely fluorinated olefin.

14. The process of claim 13, wherein the completely fluorinated olefin is selected from the group consisting of perfluoroethylene, perfluoropropylene and the higher straight chain, branched-chain and cyclic homologues thereof.

15. The process of claim 1, wherein the monomer feed contains at least one partially fluorinated olefin selected from the group consisting of vinyl fluoride, vinylidene fluoride, trifluoroethylene, 2-fluoropropylene, 1,1-difluoropropylene, 3,3,3-trifluoropropylene, 2,3,3,3-tetrafluoropropylene, 1,1,3,3,3-pentafluoropropylene and partially fluorinated olefins of the formula, $CF_2=CF-R$, wherein R is a member selected from the group consisting of aliphatic, aromatic, alkylaromatic, arylalkyl, cycloaliphatic radicals and their halogenated derivatives.

16. The process of claim 11, wherein the monomer feed material contains at least one fluoro-olefin and at least one halogenated olefin containing at least one halogen atom which is different from fluorine.

17. The process of claim 1, wherein the monomer feed material contains at least one fluoro-olefin and at least one monomer selected from the group consisting of vinyl chloride, vinylidene chloride, vinyl bromide, vinylidene bromide, 1,2-dichloroethylene, 2-chloropropylene, 3,3,3-trichloropropylene, 1,1-difluoro, 2,2-dichloroethylene, trifluorochloroethylene and trifluorobromoethylene.

18. Crystalline moldable hexafluoropropylene homopolymers which are soluble in organic solvents, said homopolymers being characterized by (1) a crystalline melting temperature of between 170° and 175° C. after being first reprecipitated from hot carbon tetrachloride and then subjected to extraction with boiling n-heptane, (2) having peaks of infrared absorption spectrum appearing at frequencies of 1290, 1270, 1200 (flex), 1090–1080, 1030 and 1010 cm.$^{-1}$, and (3) having distances between the lattice planes appearing in the X-ray powder spectrum registered with a Geiger counter which have varying intensities, the distance of 6.14 A. corresponding to a very strong intensity, the distance of 5.10 A. corresponding to a medium intensity, the distance of 4.20 A. corresponding to a very weak intensity, the distance 3.53 A. corresponding to a weak intensity, and the distance of 2.20 A. corresponding to a diffused medium intensity.

References Cited by the Examiner

UNITED STATES PATENTS

| | | | |
|---|---|---|---|
| 3,089,866 | 5/1963 | Crawford | 260—92.1 |
| 3,098,844 | 7/1963 | Polishuk | 260—92.1 |

JOSEPH L. SCHOFER, *Primary Examiner.*

WILLIAM H. SHORT, *Examiner.*

J. F. McNALLY, *Assistant Examiner.*